(12) United States Patent
Wolff et al.

(10) Patent No.: US 7,093,002 B2
(45) Date of Patent: *Aug. 15, 2006

(54) HANDLING OF MALWARE SCANNING OF FILES STORED WITHIN A FILE STORAGE DEVICE OF A COMPUTER NETWORK

(75) Inventors: Daniel Joseph Wolff, Aylesbury (GB); Joel Robert Spurlock, Portland, OR (US); Jonathan Lewis Edwards, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 711 days.

This patent is subject to a terminal disclaimer.

(21) Appl. No.: 10/004,120

(22) Filed: Dec. 6, 2001

(65) Prior Publication Data

US 2003/0110258 A1   Jun. 12, 2003

(51) Int. Cl.
   G06F 15/16   (2006.01)
   G06F 15/173  (2006.01)
   G06F 17/30   (2006.01)

(52) U.S. Cl. ............ 709/219; 709/226; 709/229; 726/24; 726/27

(58) Field of Classification Search ........ 709/217–219, 709/223–229, 232; 713/188, 200–201; 726/11–15, 726/26
See application file for complete search history.

(56) References Cited

U.S. PATENT DOCUMENTS

| | | | |
|---|---|---|---|
| 5,583,995 A | 12/1996 | Gardner et al. | 395/200.09 |
| 5,623,600 A | 4/1997 | Ji et al. | 395/187.01 |
| 5,889,943 A * | 3/1999 | Ji et al. | 713/201 |
| 6,078,929 A | 6/2000 | Rao | 707/200 |
| 6,088,803 A * | 7/2000 | Tso et al. | 726/22 |

(Continued)

OTHER PUBLICATIONS

Wu et al. "Load Balancing and Hot Spot Relief for hash Routing among a Collection of Proxy Caches" Proceedings on Distributed Computing Systems IEEE, Jun. 4, 1999, pp. 536-543.*

(Continued)

*Primary Examiner*—Bunjob Jaroenchonwanit
*Assistant Examiner*—Joseph E. Avellino
(74) *Attorney, Agent, or Firm*—Zilka-Kotab, PC.; Christopher J. Pramaty

(57) ABSTRACT

The present invention provides a load balancing device, computer program product, and method for balancing the load across a plurality of proxy devices arranged to perform malware scanning of files stored within a file storage device of a computer network. The computer network has a plurality of client devices arranged to issue access requests using a dedicated file access protocol to the file storage device in order to access files stored on the file storage device. The load balancing device is arranged so as to intercept access requests issued to the file storage device, and comprises a client interface for receiving an access request issued to the file storage device using the dedicated file access protocol. Further, the load balancing device comprises load balancing logic for applying a predetermined load balancing routine to determine to which proxy device to direct the received access request, and a proxy device interface for sending the access request to the proxy device determined by the load balancing logic, each proxy device being coupled to the file storage device. This enables a very efficient system to be developed for performing malware scanning of files stored within the file storage device, whilst enabling that system to be developed independently of the particular file storage device being used in the computer network, or the operating system being run on that file storage device.

37 Claims, 10 Drawing Sheets

U.S. PATENT DOCUMENTS

| | | | |
|---|---|---|---|
| 6,094,731 A * | 7/2000 | Waldin et al. | 714/38 |
| 6,167,438 A * | 12/2000 | Yates et al. | 709/217 |
| 6,182,142 B1 * | 1/2001 | Win et al. | 709/229 |
| 6,230,190 B1 | 5/2001 | Edmonds et al. | |
| 6,266,774 B1 * | 7/2001 | Sampath et al. | 726/24 |
| 6,275,937 B1 * | 8/2001 | Hailpern et al. | 713/201 |
| 6,304,904 B1 * | 10/2001 | Sathyanarayan et al. | 709/224 |
| 6,438,576 B1 * | 8/2002 | Huang et al. | 709/202 |
| 6,446,109 B1 * | 9/2002 | Gupta | 709/203 |
| 6,510,464 B1 * | 1/2003 | Grantges et al. | 709/225 |
| 6,687,732 B1 | 2/2004 | Bector et al. | 709/200 |
| 6,715,082 B1 | 3/2004 | Chang et al. | |
| 6,742,015 B1 * | 5/2004 | Bowman-Amuah | 709/223 |
| 6,757,830 B1 * | 6/2004 | Tarbotton et al. | 713/188 |
| 6,760,765 B1 * | 7/2004 | Asai et al. | 709/226 |
| 6,785,728 B1 * | 8/2004 | Schneider et al. | 709/229 |
| 6,826,698 B1 * | 11/2004 | Minkin et al. | 713/201 |
| 6,892,241 B1 * | 5/2005 | Kouznetsov et al. | 709/229 |
| 2002/0038339 A1 | 3/2002 | Xu | |
| 2002/0083342 A1 * | 6/2002 | Webb et al. | 713/201 |
| 2002/0091757 A1 | 7/2002 | Cuomo et al. | |
| 2002/0129277 A1 * | 9/2002 | Caccavale | 713/201 |
| 2002/0186698 A1 | 12/2002 | Ceniza | 370/401 |

OTHER PUBLICATIONS

Spare, Ian "Deploying the Squid Proxy Server on Linux" Linux Journal, Mar. 2001; article No. 5.*
Related U.S. Appl. No. 10/003,265, filed Dec. 6, 2001, Inventors: Wolff et al.
Office Action mailed Jun. 28, 2005 in U.S. Appl. No. 10/003,265, filed Dec. 6, 2001.
Copy of Office Action Summary from U.S. Appl. No. 10/003,265, which was mailed on Jan. 13, 2006.

* cited by examiner

HANDLING OF MALWARE SCANNING OF FILES STORED WITHIN A FILE STORAGE DEVICE OF A COMPUTER NETWORK

BACKGROUND OF THE INVENTION

The present invention relates to techniques for handling malware scanning of files stored within a file storage device of a computer network. As will be appreciated by those skilled in the art, "malware" may include, amongst other things, viruses, worms, Trojans, and/or computer files, words, content, etc. that have been banned for the computer network, etc.

In a computer network, it is common to provide a file server arranged to provide certain centralised services to the users of client devices connected to that network. For example, the file server will often be used to store user files for subsequent access by authorised users over the network.

It is often desirable to perform malware scanning of the files stored within such a file server, and accordingly appropriate scanning software has been written for installation on the file server so as to enable files to be scanned at appropriate times, for example when they are written to the file server, read from the file server, etc. FIG. 1 is a block diagram illustrating a typical prior art arrangement of a computer network, where the computer network comprises a number of client devices 10 coupled to a file server 30 via an appropriate communication infrastructure 20, for example a wired network. In the FIG. 1 example, a malware scanner in the form of an anti-virus (AV) scanner 40 is installed on the file server 30 to perform scanning of the files stored on the file server 30. Typically, the anti-virus scanner 40 can be configured to determine when scanning is performed (i.e. when files are read, when files are written, both, etc.), what type of files are scanned (all files, only executable files, files of a type in which a macro program may be embedded, compressed files, etc.), and what type of scanning is performed (anti-virus algorithms that compare a suspect file to a dictionary of known virus characteristics, heuristic algorithms that seek to detect virus-like activity associated with a file being scanned, etc.).

One of the problems with the approach illustrated in FIG. 1 is that the anti-virus scanner 40 may significantly impact the performance of the file server, particularly when the anti-virus scanner is configured to perform rigorous scanning of files (e.g. by scanning many file types, by employing multiple scanning algorithms, by scanning when files are both read and written, etc.). Furthermore, it is necessary to write a separate version of the anti-virus scanner for each operating system that may be used on the file server 30, for example Windows NT, Windows 2000, Novell Netware, etc.

FIG. 2 illustrates an alternative known arrangement which aims to reduce the performance impact of the FIG. 1 approach. In accordance with the FIG. 2 approach, the AV scanner 60 is placed on a separate device to the file server 30, for example a desktop PC, with a redirector program 50 being installed on the file server 30 to intercept file access requests issued by the client devices 10 and to redirect those file accesses via the link 70 to the AV scanner 60, where any appropriate AV scanning is performed prior to the file access request being processed by the file server 30. Since the heart of the AV scanner is now separated from the file server 30, this approach clearly reduces the performance impact of the scanning process on the other activities being performed by the file server 30. However, the performance of file access processes can still be adversely affected by the scanning process, for example in cases where significant numbers of the files to be accessed have to undergo anti-virus scanning before being accessed. Further, it is still necessary to write redirector software 50 for each operating system that may be used by the file server 30.

The problem of having to write different software versions for each operating system has recently been compounded by the introduction of dedicated file storage devices that can be connected to the computer network, and which are intended solely to provide for central storage of files. Since these file storage devices do not need to perform all of the other functions that are typically associated with the more traditional file storage devices such as the file server 30 illustrated in FIGS. 1 and 2, they do not require the complex operating systems that are typically installed on file servers 30. Instead, most of these recent dedicated file storage devices, such as those available from Network Appliances, EMC, IBM, etc., have a "trimmed down", proprietary operating system installed thereon to enable those storage devices solely to manage file storage and retrieval activities. These proprietary operating systems are typically not "open" operating systems, and so it is not possible to write software to run on them without obtaining the necessary approval and assistance of the device vendor.

Clearly, it would be desirable to enable any file storage device of a computer network to be scanned for malware, whether that file storage device be the more traditional file server type device, or a dedicated file storage device, and to facilitate such scanning without having to redesign and re-code the scanning software for each device/vendor. In addition, it would be desirable to farther reduce the performance impact that the malware scanning process may have on the file accessing process.

Accordingly, it is an object of the present invention to provide an improved technique for performing malware scanning of files stored within a file storage device of a computer network.

SUMMARY OF THE INVENTION

Viewed from a first aspect, the present invention provides a load balancing device for balancing the load across a plurality of proxy devices arranged to perform malware scanning of files stored within a file storage device of a computer network, the computer network having a plurality of client devices arranged to issue access requests using a dedicated file access protocol to the file storage device in order to access files stored on the file storage device, the load balancing device being arranged so as to intercept access requests issued to the file storage device, and comprising: a client interface for receiving an access request issued to the file storage device using the dedicated file access protocol; load balancing logic for applying a predetermined load balancing routine to determine to which proxy device to direct that access request; and a proxy device interface for sending the access request to the proxy device determined by the load balancing logic, each proxy device being coupled to the file storage device.

In accordance with the present invention, a load balancing device is provided for balancing the load across a plurality of devices arranged to perform malware scanning of files stored within a file storage device of a computer network. Unlike prior art malware scanning devices, the malware scanning devices whose loads are controlled by the load balancing device of the present invention act as "proxy" devices, such that the computer network is configured to ensure that file access requests issued by the client devices to the file storage device are actually routed in the first instance via the load balancing device to one of the proxy devices arranged to perform the malware scanning.

The load balancing device of the present invention is itself a "proxy" device in this context, since it will be arranged to intercept access requests issued to the file storage device. It will be appreciated that this may be done in a variety of ways, for example transparently by making the load balancing device appear to the client devices to be the file storage device, whilst the file storage device is then connected to the load balancing device via the proxy malware scanning devices rather than directly to the computer network infrastructure. Alternatively, a non-transparent implementation could be used, whereby each client device is configured to send such file access requests to the load balancing device rather than to the file storage device, even though the file storage device is connected to the computer network infrastructure. It will be appreciated that irrespective of which of the above approaches is used, the access requests issued by the client devices are still logically being issued to the file storage device, since that is where the files the subject of the file access requests are stored. However, the computer network is configured such that the load balancing device will intercept such access requests and hence enable any appropriate malware scanning to be performed by one of the proxy devices controlled by the load balancing device.

The inventors of the present invention realised that irrespective of the operating system installed on the file storage device itself, most file access requests to such file storage devices are issued using a dedicated file access protocol, and the number of these dedicated file access protocols is far less than the number of different operating systems used on the various file storage devices that are currently available.

Hence, in accordance with the present invention, the load balancing device can be arranged to have a client interface for receiving an access request issued by one of the client devices to the file storage device using the dedicated file access protocol, and is then arranged to communicate via a proxy device interface with an appropriate proxy device to cause selected malware scanning algorithms to be executed to determine whether the file identified by the access request is to be considered as malware. Since the proxy devices are also coupled to the file storage device, they can be arranged to cause the file storage device to process the access request dependent on the results of the malware scanning.

In accordance with the present invention, the load balancing device includes load balancing logic arranged to apply a predetermined load balancing routing to determine to which proxy device to direct any particular access requests received at the client interface. It will be appreciated by those skilled in the art that there are a number of known load balancing routines which could suitably be used by the load balancing logic to perform a balancing of the load across the plurality of proxy devices.

By arranging the client interface to recognise access requests issued using the dedicated file access protocol, it is possible to provide a system for malware scanning which is not dependent on the vendor of the file storage device or the operating system installed on that file storage device, and which is accordingly able to be used without modification within any computer network where the file access requests are issued using the dedicated file access protocol. Further, by arranging the load balancing device to perform predetermined load balancing routines to determine to which proxy device to direct any particular access request, it is possible to significant reduce the likelihood of the malware scanning process impacting the performance of file accesses, since multiple malware scanning proxy devices can then be used to perform malware scanning of files requested by client devices.

In preferred embodiments, the dedicated file access protocol is the Server Message Block (SMB) protocol and the access requests are SMB calls issued to the file storage device. The SMB protocol is the protocol used in a Microsoft Windows environment to enable machines to access data from a Microsoft Windows machine over the computer network. This protocol is also sometimes referred to as the Common Internet File System (CIFS). In an alternative embodiment, the dedicated file access protocol is the Network File System (NFS) protocol, and the access requests are NFS calls issued to the file storage device. The NFS protocol is used in Unix-based systems for accessing data, particularly systems from Sun Microsystems, Inc.

As mentioned earlier, there are a number of load balancing routines which may be employed by the load balancing logic to determine to which proxy device to direct an access request received at the client interface. In a preferred embodiment, the load balancing routine is arranged, upon receipt of an access request, to poll each of the plurality of proxy devices, and to cause the access request to be sent to the first proxy device in said plurality that replies with an indication that it is available to handle the access request. In such embodiments, the load balancing device is preferably provided with a buffer so that it is able to temporarily buffer any access requests in the event that all of the proxy devices are busy. Alternatively the load balancing device could be arranged to advise the client device that issued the access request that the system is busy, and that the access request should be resubmitted later.

In an alternative embodiment, the load balancing routine may be arranged to apply a "round robin" system of allocation of access requests to proxy devices in said plurality so as to evenly distribute the access requests amongst the plurality of proxy devices. In such embodiments, a buffer could be provided for each proxy device, either within the load balancing device, or within the proxy devices themselves, to buffer any access requests allocated to a proxy device in situations where that proxy device is currently busy and hence unable to begin processing that access request. Alternatively the load balancing device might be arranged to only allocate a request if the selected proxy device is ready to process it, and if the proxy device is busy (or all proxy devices are busy) to advise the client device that issued the access request that the system is busy, and that the access request should be resubmitted later.

In yet another alternative embodiment, the proxy device interface may be arranged to receive a ready signal from each proxy device in said plurality indicating whether that proxy device is ready to receive an access request, the load balancing routine being arranged to refer to said ready signals when determining to which proxy device to direct a particular access request. Again, in such embodiments, the load balancing device can be provided with a buffer in order to enable access requests to be temporarily buffered in the event that no ready signals have been received by the load balancing device at the time that the access request is received. Alternatively the load balancing device could be arranged to advise the client device that issued the access request that the system is busy, and that the access request should be resubmitted later.

As mentioned earlier, there are a number of different ways in which the computer network can be configured to enable the load balancing device of the present invention to be used in combination with the plurality of proxy devices to perform efficient malware scanning. In a preferred embodiment, each device in the computer network is assigned an identifier, and the load balancing device is assigned the same identifier as is assigned to the file storage device, the client interface being connectable to a communication infrastructure of the computer network to enable communication between the load balancing device and said client devices, whilst the plurality of proxy devices are connectable to the proxy device interface and the file storage device is connectable to each proxy device, such that the file storage device is only accessible by said client devices via said load balancing device and one of said proxy devices. In such an arrangement, the presence of the load balancing device and the plurality of proxy devices will be entirely transparent to the client devices, in that the client devices will merely issue file access requests in the usual manner using the identifier of the file storage device, and this will automatically cause the file access requests to be received by the load balancing device. In such an arrangement, it is not possible to access the file storage device directly via the communication infrastructure of the computer network.

It will be appreciated that if the computer network were to have a plurality of file storage devices, it would be possible to provide a separate load balancing device, and associated plurality of proxy devices, associated with each file storage device. Alternatively, a single load balancing device, and an associated plurality of proxy devices, could be used for the plurality of file storage devices, with the plurality of file storage devices being connected to each of the proxy devices, each file storage device having a different identifier, and the load balancing device being assigned multiple identifiers corresponding to the identifiers of the file storage devices connected to the plurality of proxy devices, the client interface being configured to receive any access requests issued to one of said file storage devices connected to the plurality of proxy devices. This latter approach may be a cost effective implementation in scenarios where one bank of proxy scanning devices managed by a single load balancing device are sufficient to provide the desired speed of malware scanning for files being accessed across the plurality of file storage devices without resulting in a "bottleneck" which might otherwise adversely impact the file access performance.

As an alternative to the transparent approach described above, each device in the computer network may be assigned an identifier, the load balancing device being assigned a unique identifier different to the identifier of the file storage device, the client devices, the load balancing device and the file storage device being connectable to a communication infrastructure of the computer network, the client devices being configured such that access requests issued by the client devices are routed to the load balancing device, and the file storage device being configured to return each processed access request to the proxy device from which that access request was received. In such an arrangement, some configuration is required on each client device to ensure that access requests are sent to the proxy device, rather than directly to the file storage device. It will be appreciated that the file access requests are still being logically issued to the file storage device, but that the configuration of the client devices ensures that the load balancing device is arranged to intercept such access requests. Whilst such an approach would require some extra configuration over the transparent approach described earlier, it would have the advantage that it would allow the computer network administrator to have direct access to the file storage device over the network, and would also allow for the client devices to be given direct access to the file storage device in the event of failure of the load balancing device, etc.

Viewed from a second aspect, the present invention provides a balanced proxy system for performing malware scanning of files stored within a file storage device of a computer network, the computer network having a plurality of client devices arranged to issue access requests using a dedicated file access protocol to the file storage device in order to access files stored on the file storage device, the balanced proxy system being arranged so as to intercept access requests issued to the file storage device, and comprising: a plurality of proxy devices arranged to perform said malware scanning of files stored within the file storage device; and a load balancing device in accordance with the first aspect of the present invention for determining to which of said plurality of proxy devices to direct any particular access request; each proxy device comprising: (a) a first interface for receiving from the load balancing device an access request issued by one of said client devices to said file storage device using the dedicated file access protocol; (b) a second interface for communicating with the file storage device to cause the file storage device to process the access request; (c) processing logic for causing selected malware scanning algorithms to be executed to determine whether the file identified by the access request is to be considered as malware.

It will be appreciated that the processing logic can be arranged in a variety of ways to ensure that selected malware scanning algorithms are executed for particular file access requests. However, in preferred embodiments, the processing logic is responsive to configuration data to determine which malware scanning algorithms should be selected for a particular file, each proxy device further comprising a scanning engine to execute the malware scanning algorithms selected by the processing logic. This approach enables the scanning algorithms to be selected dependent on the file requiring scanning.

In preferred embodiments, each proxy device further comprises a file cache for storing files previously accessed by the client devices, upon receipt of an access request identifying a file to be read from the file storage device, the processing logic being arranged to determine whether the file identified by the access request is stored in the file cache and if so to return the file to the client device via the load balancing device without communicating with the file storage device via the second interface. Hence, in such embodiments, commonly used files can be stored within a file cache of the proxy device to provide improved performance when accessing those files. The file cache can be placed at any appropriate point within the proxy device. For example, it could be located at the interface to the file storage device so as to cache the file prior to any scanning being performed by the proxy device. However, in preferred embodiments, the file cache is arranged only to store files which have been determined not to be considered as malware, and hence will typically be located at the interface to the load balancing logic, so as to cache files which have already been scanned by the processing logic.

In an alternative embodiment, or as an additional element of the above embodiments, a cache may be maintained by the load balancing device to contain details about the files accessed via any of the proxy devices. For example, such a cache could store the results structure of the files retrieved by the various proxy devices, such as for example which proxy device serviced a request for a particular file, whether that file was passed as not being considered as malware by the malware scanning process, etc. This information could be used by the load balancing device such that, if the same file is requested later, the load balancing device can allocate the request to the same proxy device that handled the request for that file last time, and/or can tell the proxy device to which the request is allocated not to perform any malware scanning as the file has already been scanned.

An alternative possibility would be to maintain a single file cache at the load balancing device to contain files accessed by any of the proxy devices, but this may require an unduly large cache.

In preferred embodiments, upon receipt of an access request from the load balancing device, the processing logic of the relevant proxy device is arranged to determine from the access request predetermined attributes, and to send those predetermined attributes to the file storage device to enable the file storage device to perform a validation check, the processing logic only allowing the access request to proceed if the file storage device confirms that the client device is allowed to access the file identified by the file access request. This process will typically be performed as soon as the access request is received to ensure that the proxy device does not waste time processing an invalid access request. It will be appreciated that the predetermined attributes relating to the access request may take a variety of forms, for example user name, domain, password, an indication of the file to be accessed, a TCP/IP address of the client machine, etc. As a bare minimum, the predetermined attributes will typically include an indication of the file to be accessed, and an indication of the user name.

In preferred embodiments, the proxy device further comprises a user cache for storing the predetermined attributes, as these attributes will typically be re-used by the proxy device during the processing of the file access request.

Viewed from a third aspect, the present invention provides a method of operating a load balancing device to balance the load across a plurality of proxy devices arranged to perform malware scanning of files stored within a file storage device of a computer network, the computer network having a plurality of client devices arranged to issue access requests using a dedicated file access protocol to the file storage device in order to access files stored on the file storage device, the load balancing device being arranged so as to intercept access requests issued to the file storage device, and the method comprising the steps of: (a) receiving an access request issued to the file storage device using the dedicated file access protocol; (b) applying a predetermined load balancing routine to determine to which proxy device to direct that access request; and (c) sending the access request to the proxy device determined at said step (b), each proxy device being coupled to the file storage device.

Viewed from a fourth aspect, the present invention provides a computer program product operable to configure a load balancing device to perform a method of balancing the load across a plurality of proxy devices arranged to perform malware scanning of files stored within a file storage device of a computer network, the computer network having a plurality of client devices arranged to issue access requests using a dedicated file access protocol to the file storage device in order to access files stored on the file storage device, the load balancing device being arranged so as to intercept access requests issued to the file storage device, and the computer program product comprising: (a) client interface code operable to receive an access request issued to the file storage device using the dedicated file access protocol; (b) load balancing code operable to apply a predetermined load balancing routine to determine to which proxy device to direct that access request; and (c) proxy device interface code operable to send the access request to the proxy device determined by the load balancing logic, each proxy device being coupled to the file storage device.

Viewed from a fifth aspect, the present invention provides a computer program product operable to configure a balanced proxy system to perform a method of malware scanning of files stored within a file storage device of a computer network, the computer network having a plurality of client devices arranged to issue access requests using a dedicated file access protocol to the file storage device in order to access files stored on the file storage device, the balanced proxy system being arranged so as to intercept access requests issued to the file storage device, the balanced proxy system comprising a plurality of proxy devices arranged to perform said malware scanning of files stored within the file storage device, and a load balancing device for determining to which of said plurality of proxy devices to direct any particular access request, the computer program product comprising: a first computer program product in accordance with the fourth aspect of the present invention operable to configure the load balancing device to perform a method of balancing the load across the plurality of proxy devices; and a second computer program product operable to configure each proxy device to perform said malware scanning, comprising: reception code operable to receive from the load balancing device an access request issued by one of said client devices to said file storage device using the dedicated file access protocol; communication code operable to communicate with the file storage device to cause the file storage device to process the access request; and algorithm invoking code operable to cause selected malware scanning algorithms to be executed to determine whether the file identified by the access request is to be considered as malware.

BRIEF DESCRIPTION OF THE DRAWINGS

The present invention will be described further, by way of example only, with reference to embodiments thereof as illustrated in the accompanying drawings, in which.

DESCRIPTION OF A PREFERRED EMBODIMENT

Figure 1:
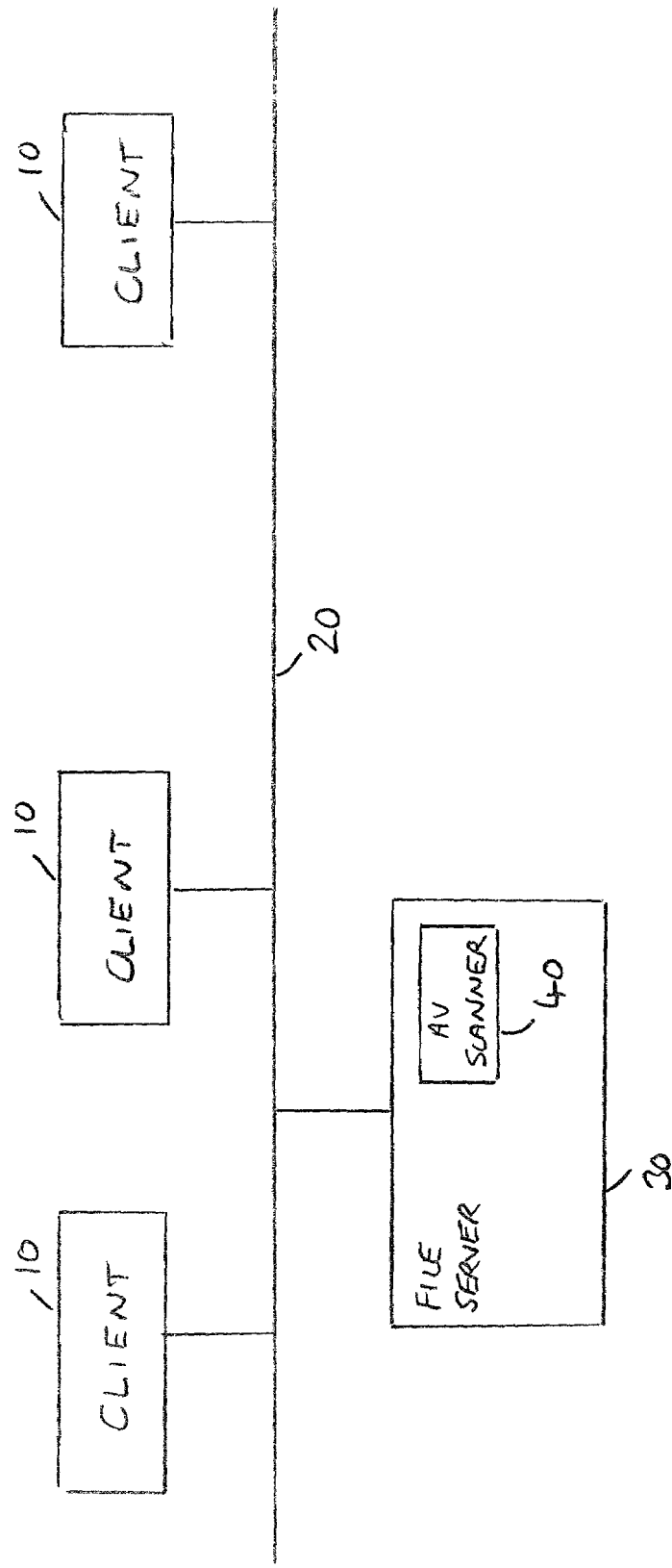
FIG. 1 is a block diagram of a prior art computer network arranged to perform anti-virus scanning of files stored within a file server.
Figure 2:
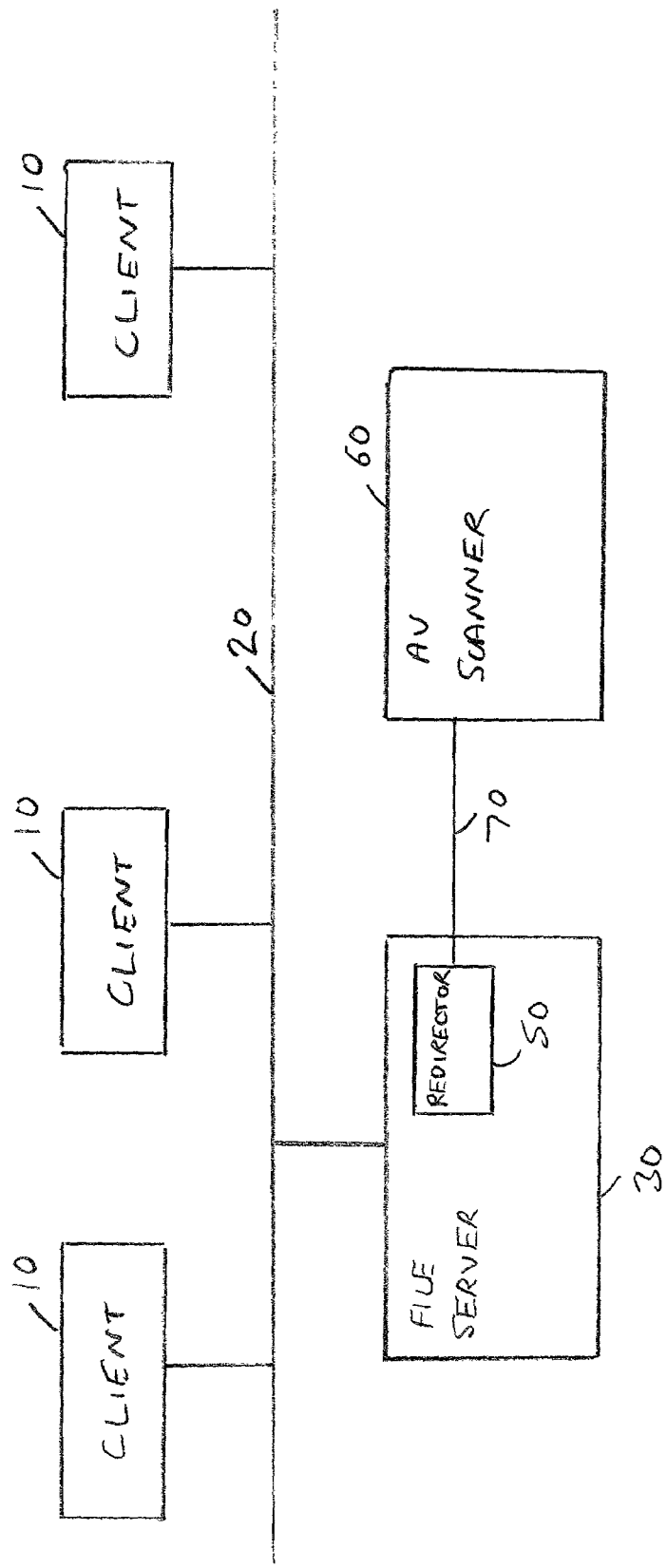
FIG. 2 is a an alternative prior art embodiment of a computer network arranged to perform anti-virus scanning of files stored within a file server.
Figure 3:
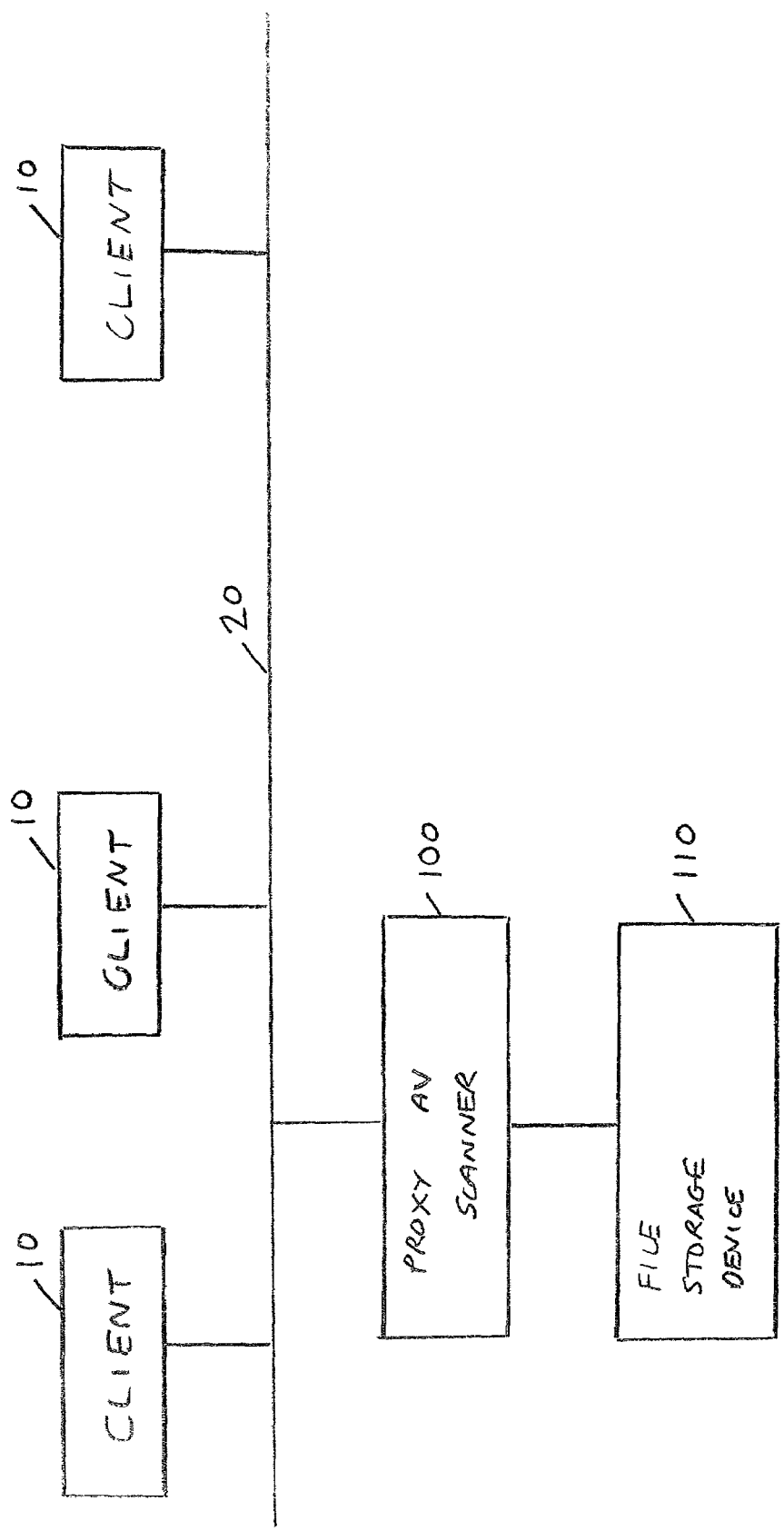
FIG. 3 is a block diagram illustrating a computer network having a proxy anti-virus (AV) scanner according to an embodiment of the present invention.

FIG. 3 is a block diagram of a computer network having a proxy anti-virus (AV) scanner according to a first embodiment of the present invention, where a proxy AV scanner of preferred embodiments is used in a "transparent" configuration. As shown in FIG. 3, the client devices 10 are connected via an appropriate communication infrastructure (20), for example a wired network, with the proxy AV scanner 100, the file storage device 110 then being connected to the proxy AV scanner 100, but not being directly connected to the communication infrastructure 20. In a typical computer network, each device will be assigned a unique identifier, for example a name, so that communications can be directed to specific devices in the network. In accordance with the FIG. 3 embodiment, the proxy AV scanner 100 of preferred embodiments is actually given the same identifier as the file storage device 110, such that when the client devices 10 issue file access requests to the file storage device 110, specifying the identifier of the file storage device, those requests are actually directed to the proxy AV scanner 100. The proxy AV scanner 100 will then communicate with the file storage device 110 as required in order to process the access request, whilst also performing any necessary anti-virus scanning (or other malware scanning) provided by the proxy AV scanner.

Figure 6:
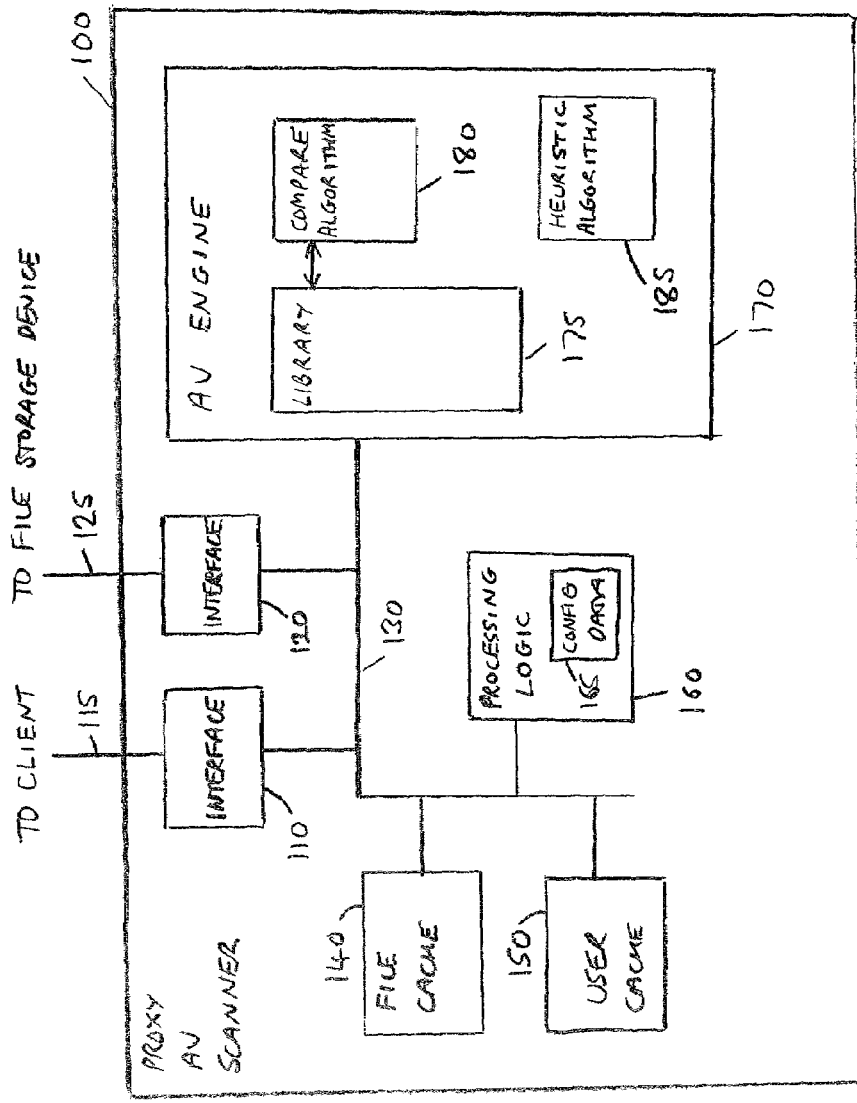
FIG. 6 is a block diagram illustrating the construction of a proxy anti-virus (AV) scanner in accordance with a preferred embodiment of the present invention.
Figure 7:
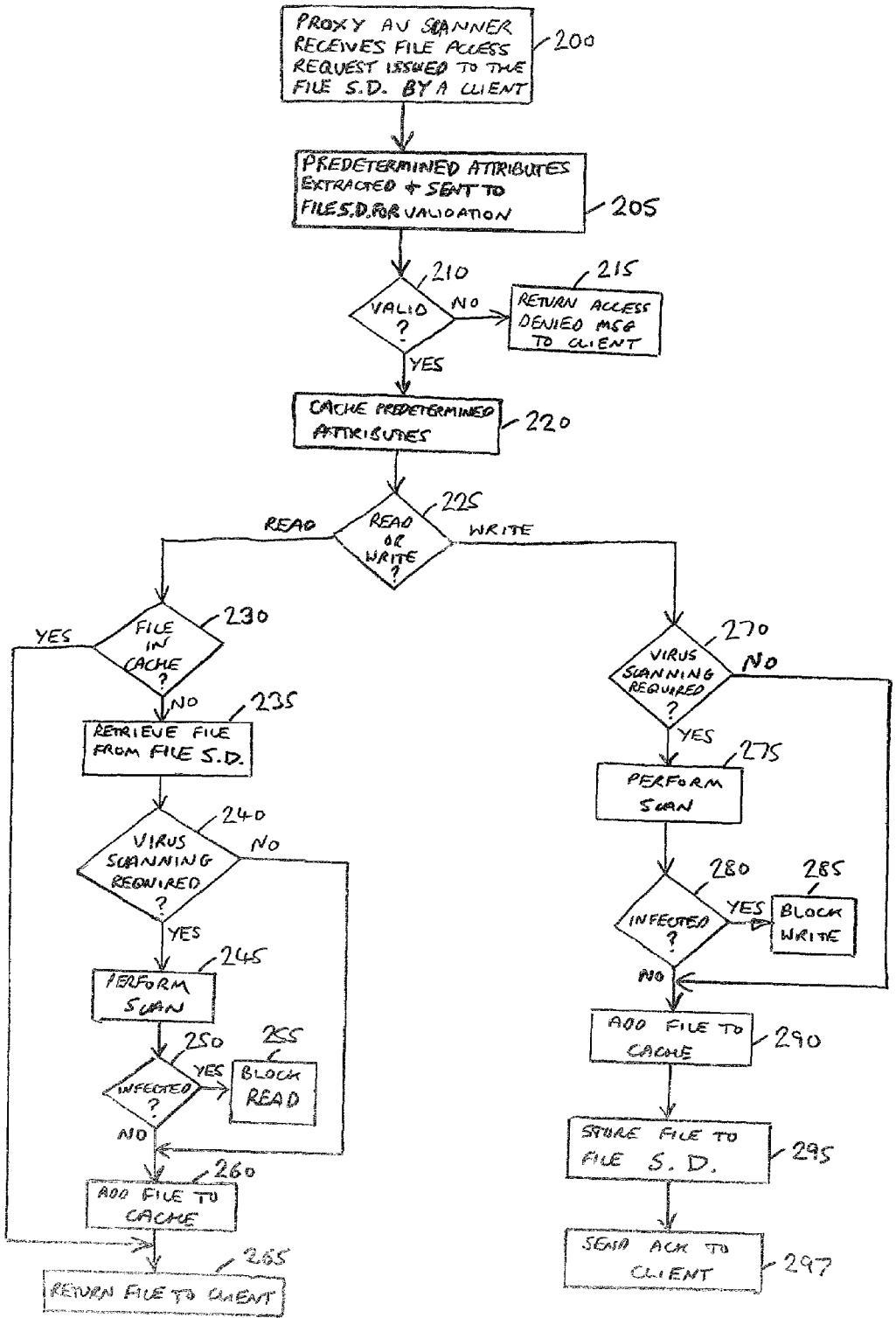
FIG. 7 is a flow diagram illustrating the process performed by the proxy AV scanner of FIG. 6.

The construction of the proxy AV scanner 100 in accordance with preferred embodiments is illustrated in FIG. 6, whilst the process performed by that proxy AV scanner in preferred embodiments is illustrated in FIG. 7. In preferred embodiments, the computer network illustrated in FIG. 3 is a Microsoft Windows based system, where the Server Message Block (SMB) protocol is used for file access requests. Hence, when one of the client devices 10 issues a file access request using the SMB protocol, this will be received by the proxy AV scanner 100 at step 200 of FIG. 7. Referring to FIG. 6, this request will be received at the interface 110 over path 115.

The processing logic 160 within the proxy AV scanner 100 will then extract at step 205 predetermined attributes from the file access request, and cause them to be sent via the interface 120 over path 125 to the file storage device 110 for validation. Examples of the predetermined attributes extracted are the user name and password of the user making the request, the domain of the client device, an indication of the file to be accessed, the TCP/IP address of the client device, etc. Based on this information, the file storage device will be able to determine whether the user making the file access request is actually entitled to access the file specified by the file access request.

The processing logic 160 then waits at step 210 until it receives a response from the file storage device 110 via the interface 120 indicating whether the file access request is valid. If the file access request is not valid, then the process proceeds to step 215, where a message would typically be returned to the client device indicating that the file access request has been denied.

However, assuming at step 210 it is determined that the file access request is valid, the processing logic 160 is then arranged at step 220 to cache the predetermined attributes within the user cache 150.

The process then proceeds to step 225, where the processing logic 160 is arranged to determine whether the file access request relates to a read of a file, or a write to a file. Assuming the file access request specifies a read of a file, then the process branches to step 230, where the file cache 140 is checked to determine whether the file being requested is stored within the file cache 140. If it is, then the process proceeds directly to step 265, where the file is returned via the interface 110 to the client device 10.

However, assuming that the file is not within the file cache 140, then the file is retrieved at step 235 from the file storage device 110 via the interface 120.

At step 240, it is then determined whether virus scanning is required for this particular file. This determination will typically be made by the processing logic 160 having regard to configuration data 165 which will specify, for example, when scanning should be performed, what type of files should be scanned, what type of scanning algorithms should be employed, etc. Hence, as an example, the configuration data 165 may specify that only executable files should be scanned, that files of a type in which a macro program may be embedded should be scanned, that all compressed files should be scanned, or simply that all files should be scanned. Further, the configuration data may specify whether compare algorithms of the type that compare a suspect file to a dictionary of known virus characteristics should be used, and/or whether one or more heuristic algorithms that seek to detect virus-like activity should be used. Additionally, the configuration data may specify whether files are scanned when written to the storage device, when read from the storage device, both, etc.

If it is determined at step 240 that virus scanning is not required, then the process proceeds directly to step 260, where the retrieved file is added to the file cache 140, and then returned to the client device at step 265 via the interface 110. However, assuming it is determined at step 240 that virus scanning is required, then the process proceeds to step 245, where the processing logic 160 instructs the anti-virus engine 170 to perform the necessary anti-virus scanning. The anti-virus engine 170 includes a base comparison algorithm 180 and a base heuristic algorithm 185. The base comparison algorithm 180 is arranged to compare files to be scanned against a plurality of characteristics of known viruses stored within a library of virus definitions 175. Parameters passed by the processing logic 160 to the anti-virus engine 170 based on the configuration data 165 control the options selected for the base algorithms 180, 185. In particular, these parameters control which types of file are scanned, whether compressed files are decompressed prior to scanning, what type of heuristic behaviours are searched for and the like.

The process then proceeds to step 250, where it is determined whether the file is infected by a virus, this being indicated by the output from the anti-virus engine 170. If the file is infected, then the process proceeds to step 255, where reading of that file is blocked, and typically the client device 10 will then be informed that access to the file has been blocked. If it is determined at step 250 that the file is not infected, then the process proceeds to step 260, where that file is then added to the file cache 140, and then returned at step 265 via the interface 110 to the client device 10.

If at step 225, it is determined that the file access request relates to a write of a file, then the process branches to step 270, where it is determined whether virus scanning is required. If not, then the process proceeds to step 290, where the file to be written is added to the file cache 140, the process the proceeding to step 295 where that file is then stored to the file storage device 110 via the interface 120, where after an acknowledgement is returned to the client at step 297 via the interface 110 to inform the client device that the write access request has been performed. If at step 270, it is determined that virus scanning is required, then the necessary scanning is performed at step 275, after which it is determined at step 280 whether the file is infected. If so, then that write process is blocked at step 285, at which point the client device will typically be informed that the write access request cannot be completed. If the file is determined not to be infected at step 280, then the process proceeds to step 290, whereupon steps 290, 295 and 297 are performed as described above. The processes performed at steps 270, 275, 280 and 285 are fundamentally the same as those described earlier with reference to steps 240, 245, 250 and 255.

Figure 4:
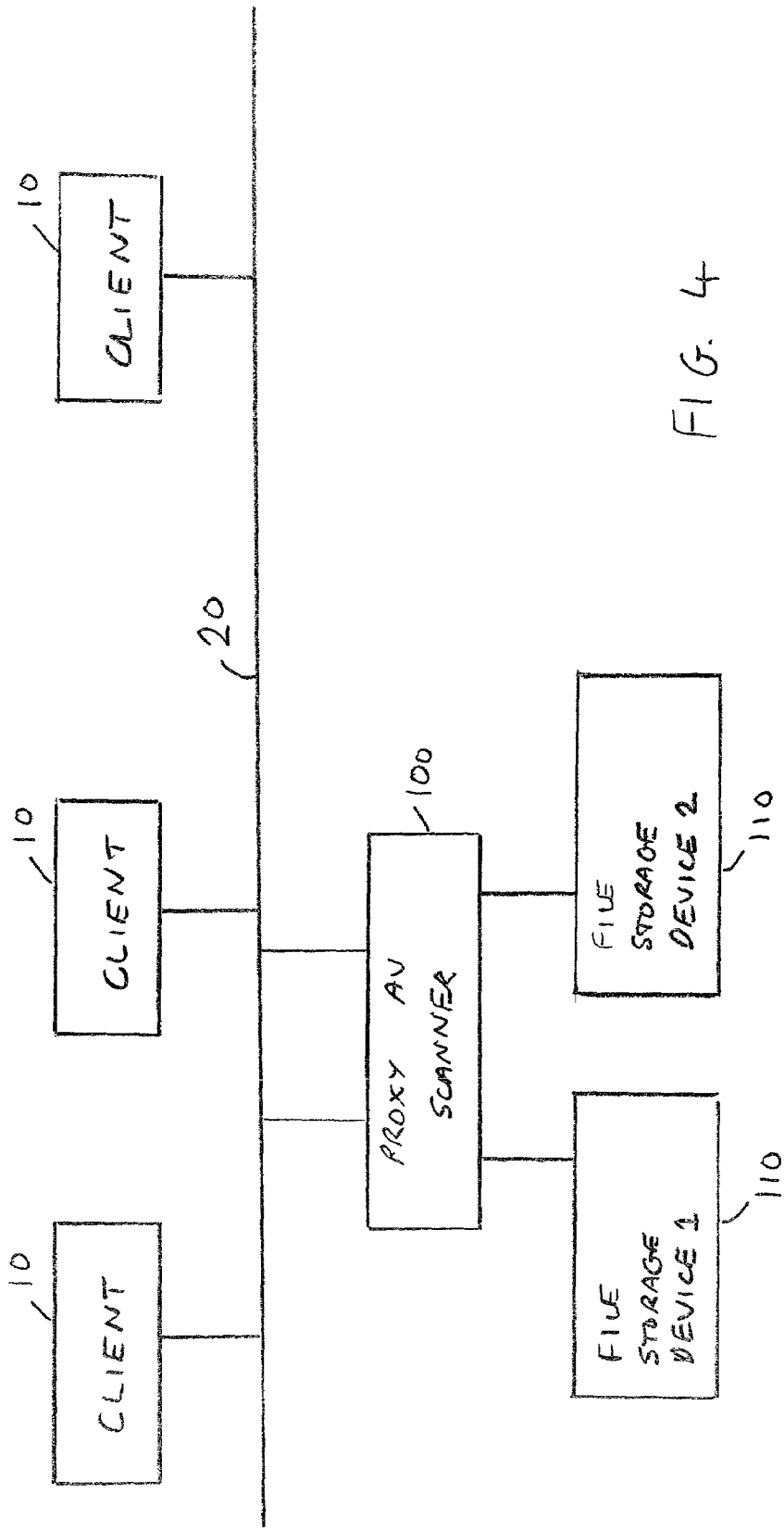
FIG. 4 is a block diagram illustrating an alternative configuration of the computer network of FIG. 3.

Returning to FIG. 3, it will be appreciated that if multiple file storage devices 110 are included in the computer network, then a separate proxy AV scanner 100 can be provided for each file storage device. Alternatively, a more cost effective approach which may be utilised in situations where the scanning required is unlikely to produce a performance "bottleneck", is illustrated in FIG. 4, where a single proxy AV scanner 100 is arranged to provide the necessary scanning for multiple file storage devices 110. For the transparency to be maintained, it will be necessary for the proxy AV scanner 100 to be assigned identifiers corresponding to the separate identifiers of the file storage devices 110 connected to the proxy AV scanner 100. Hence, in the example of FIG. 4, the proxy AV scanner 100 will need to be assigned two identifiers corresponding to the identifiers of each of the two file storage devices 110 connected thereto. Referring to FIG. 6, in preferred embodiments two interfaces 110 to the client devices would preferably be provided within the proxy AV scanner 100, such that access requests directed to file storage device 1 would arrive at one of the interfaces, whilst file access requests directed to file storage device 2 would be received at the other interface. Similarly, in preferred embodiments, two interfaces 120 would be provided to enable the proxy AV scanner 100 to separately communicate with file storage device 1 and file storage device 2. However, it will be appreciated by those skilled in the art that, with appropriate software, it might be possible for the proxy AV scanner 100 to still retain a single physical interface 110 to the client devices 10, and a single physical interface 120 to the file storage devices.

Figure 5:
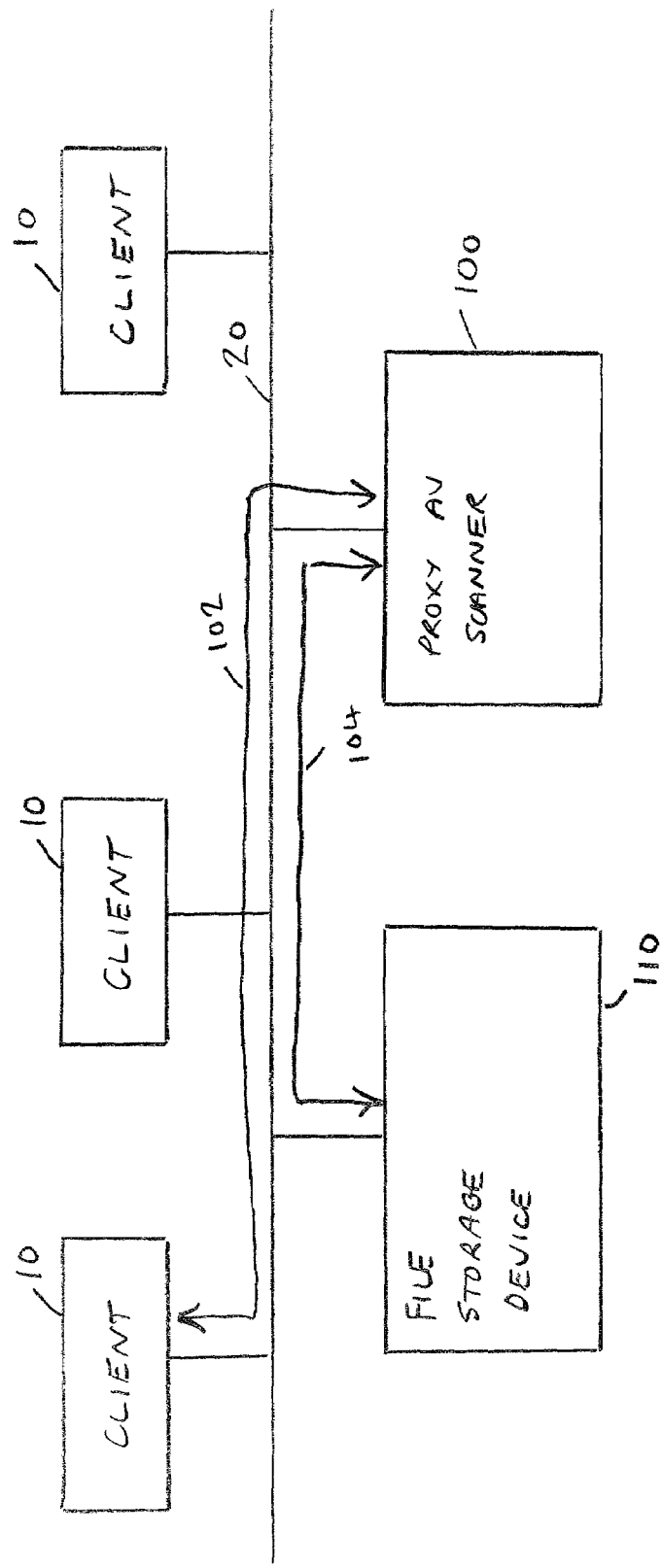
FIG. 5 is a block diagram illustrating a computer network having a proxy anti-virus (AV) scanner according to an alternative embodiment of the present invention.

An alternative embodiment is illustrated in FIG. 5, where instead of the transparent configuration of FIG. 3, the file storage device 110 is actually connected directly to the communications infrastructure 20, so that in principle both the file storage device 110 and the proxy AV scanner 100 are individually addressable by the client devices 10. In this configuration, the proxy AV scanner 100 will be given a unique identifier different to the identifier of the file storage device 110, and the client devices 10 are then configured such that they issue any SMB file access requests to the proxy AV scanner 100, rather than directly to the file storage device 110. Hence, if the first client device 10 wishes to issue a file access request to the file storage device 110, it in fact issues a file access request over path 102 to the proxy AV scanner 100, which then communicates over path 104 to the file storage device 110. The accessed files are then returned via the proxy AV scanner 100 to the client device 10.

Whilst the approach of FIG. 5 is more complex, in that it involves some active reconfiguration of each client device 10 to ensure that file access requests are correctly routed to the proxy AV scanner 100, it does have the benefit that it enables the network administrator to have direct access to the file storage device 110 via the communication infrastructure 20 of the computer network. Further, it provides some robustness in the event of failure of the proxy AV scanner 100 for any reason, since in the event of such a failure, it would be possible to reconfigure each of the client devices so that they could access the file storage device 110 directly, albeit without the anti-virus scanning being in place.

Figure 8:
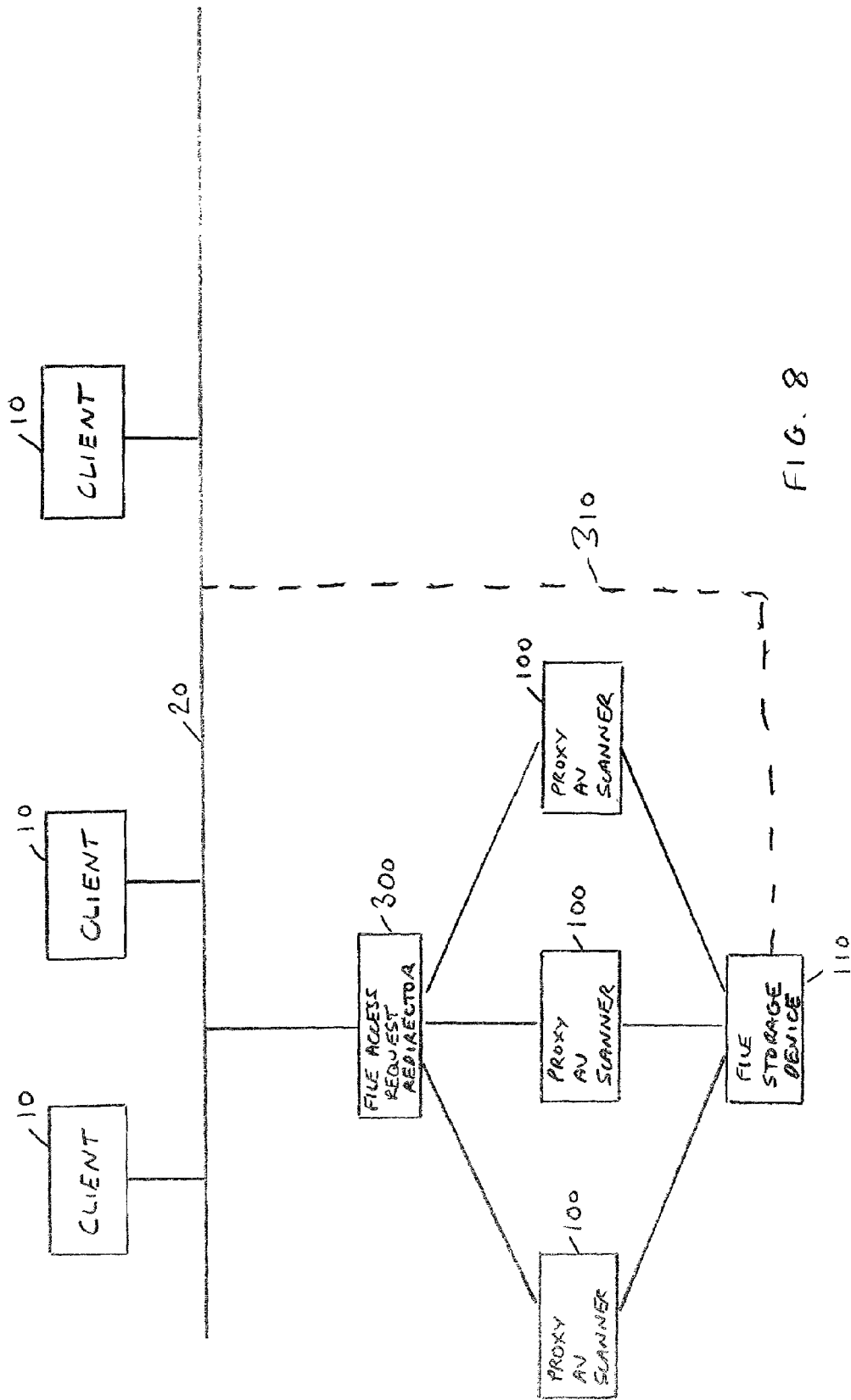
FIG. 8 is a block diagram illustrating a computer network using multiple proxy AV scanners in accordance with one embodiment of the present invention.

FIG. 8 illustrates an embodiment of the present invention which may be used in implementations where the throughput of an individual proxy AV scanner 100 might cause a bottleneck, and hence impact overall file access performance. Such a situation might occur, for example, in situations where very rigorous file scanning procedures are in place, for example where all files are scanned, where files are scanned when they are both read or written, where multiple different types of scanning algorithm are used, etc. In accordance with the configuration of FIG. 8, a transparent approach is still maintained, where a single file access request redirector 300 is connected to the information infrastructure 20 of the network, such that any file access request issued by the client devices 10 to the file storage device 110 is actually routed directly to the file access request redirector 300. Hence, in an analogous manner to that described earlier with reference to FIG. 3, the file access request redirector 300 is assigned the same identifier as that assigned to the file storage device 110, and the file storage device 110 is not connected directly to the communications infrastructure 20. Alternatively, as indicated by the dotted line 310, the file storage device 110 could be directly connected to the communication infrastructure 20 in which event the file access request redirector 300 would be given a different unique identifier to that assigned to the file storage device 110, and the configuration would be somewhat analogous to that shown earlier with reference to FIG. 5.

Between the file access request redirector 300 and the file storage device 110 are located a plurality of proxy AV scanners 100 which are each capable of performing anti-virus scanning of files being accessed. In such embodiments, the job of the file access request redirector 300 is to receive each access request issued by the client devices, and to perform some load balancing techniques to determine which proxy AV scanner 100 should service a particular file access request. As mentioned earlier, the aim of such an approach is to remove any bottleneck that might otherwise occur as a result of the requirement to scan accessed files for viruses.

Figure 10:
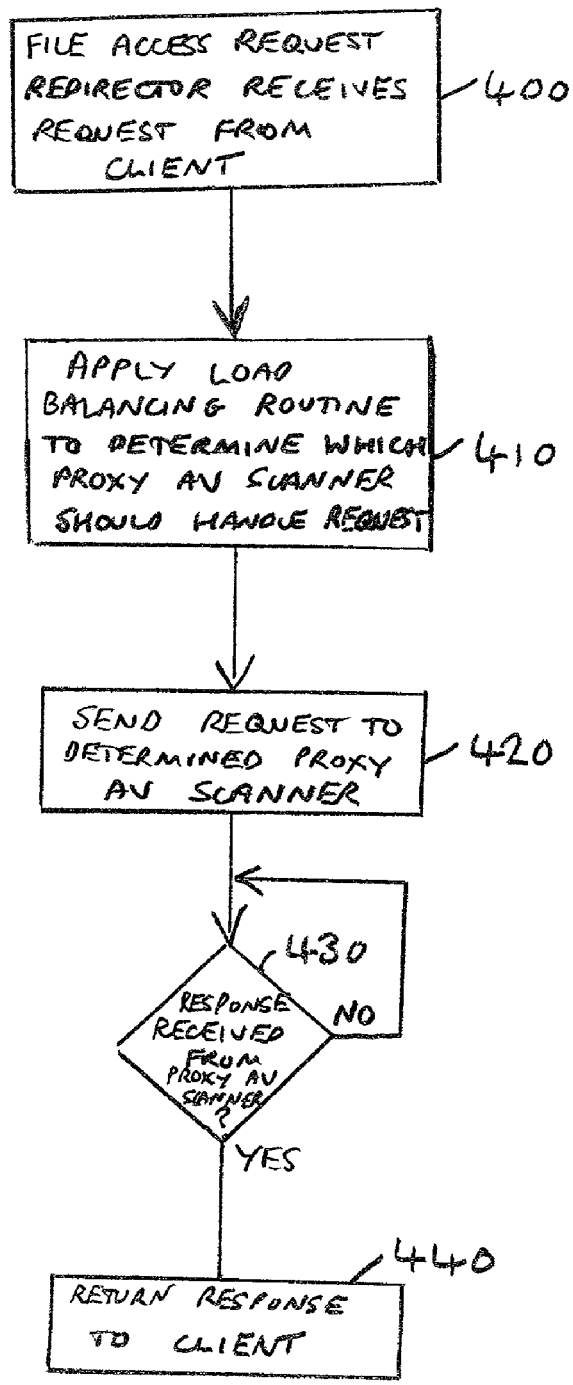
FIG. 10 is a flow diagram illustrating the process performed within the file access request redirector illustrated in FIG. 8.

The process performed by the file access request redirector in preferred embodiments is illustrated in FIG. 10. At step 400, the file access request redirector receives a file access request from one of the client devices 10, where after the process proceeds to step 410 where a predetermined load balancing routine is applied to determine which proxy AV scanner 100 should handle the file access request.

It will be appreciated by those skilled in the art that any one of a number of known load balancing techniques could be used at step 410. For example, upon receipt of an access request, the file access request redirector 300 may be arranged to poll each of the plurality of proxy AV scanners 100 in order to seek an indication as to which, if any, of the proxy AV scanners 100 are currently available to handle the file access request. Each proxy AV scanner 100 would then return a message to the file access request redirector indicating its availability. In such an approach, the file access request redirector 300 would preferably be arranged to send the file access request to the first proxy AV scanner that replies with an indication that it is available to handle the file access request. A buffer may be provided within the file access request redirector to buffer any file access requests in the event that all of the proxy AV scanners are currently busy. Alternatively, the load balancing device could be arranged to advise the client device that issued the access request that the system is busy, and that the access request should be resubmitted later.

An alternative load balancing routine that could be applied might involve a "round robin" system of allocation of access requests to proxy AV scanners 100 so as to evenly distribute the access requests amongst the plurality of proxy AV scanners 100. Hence, a first access request would go to proxy AV scanner 1, a second access request would go to proxy AV scanner 2, a third access request would go to proxy AV scanner 3, after which the allocation would loop back to proxy AV scanner 1, which would then receive a fourth file access request, etc. In such embodiments, separate buffers could be provided for each of the proxy AV scanners 100, either within each proxy AV scanner or within the file access request redirector, to buffer file access requests until the corresponding AV scanner 100 is available to process them. Alternatively the load balancing device might be arranged to only allocate a request if the selected proxy device is ready to process it, and if the proxy device is busy (or all proxy devices are busy) to advise the client device that issued the access request that the system is busy, and that the access request should be resubmitted later.

Another alternative would be for each proxy AV scanner 100 to actively issue a ready signal when it is available to receive an access request, with the load balancing routine in the file access request redirector 300 then being arranged to refer to those ready signals in order to determine to which proxy AV scanner to direct a particular access request. Assuming ready signals have been received from multiple proxy AV scanners 100, then a round robin type approach could be used to allocate individual access requests. Again, a buffer could be provided within the file access request redirector 300 to buffer any file access requests in the event that none of the proxy AV scanners have issued a current ready signal at the time an access request is received. Alternatively the load balancing device could be arranged to advise the client device that issued the access request that the system is busy, and that the access request should be resubmitted later.

Returning to FIG. 10, once it has been determined at step 410 which proxy AV scanner should handle an individual request, then that request is sent to the relevant proxy AV scanner 100 at step 420. The process will then proceed to step 430, where the file access request redirector 300 will await a response from the relevant proxy AV scanner 100. It will be appreciated by those skilled in the art that whilst the file access request redirector 300 is awaiting a response at step 430, it may actively be processing other file access requests.

The relevant proxy AV scanner will then perform the process as described earlier with reference to FIGS. 6 and 7, resulting in the event of a read request in the return of the file to be sent to the client, or a message being issued indicating that the read access has been blocked because a virus has been detected, or in the event of a write access resulting in an acknowledgement being issued to indicate that the file has been successfully written to the file storage device, or a message being issued indicating that the write process has been blocked because a virus has been located. Alternatively, if it is determined by the proxy AV scanner that the user making the access request is not authorised to access the identified file, an access denied message may be issued. Any of these responses will be detected by the file access request redirector 300 at step 430, and then returned to the client device at step 440.

Optionally, a cache may be maintained by the load balancing device to contain details about the files accessed via any of the proxy devices. For example, such a cache could store the results structure of the files retrieved by the various proxy devices, such as for example which proxy device serviced a request for a particular file, whether that file was passed as not being considered as malware by the malware scanning process, etc. This information could be used by the load balancing device such that, if the same file is requested later, the load balancing device can allocate the request to the same proxy device that handled the request for that file last time, and/or can tell the proxy device to which the request is allocated not to perform any malware scanning as the file has already been scanned.

An alternative possibility would be to maintain a single file cache at the load balancing device to contain files accessed by any of the proxy devices, but this may require an unduly large cache.

Figure 9:
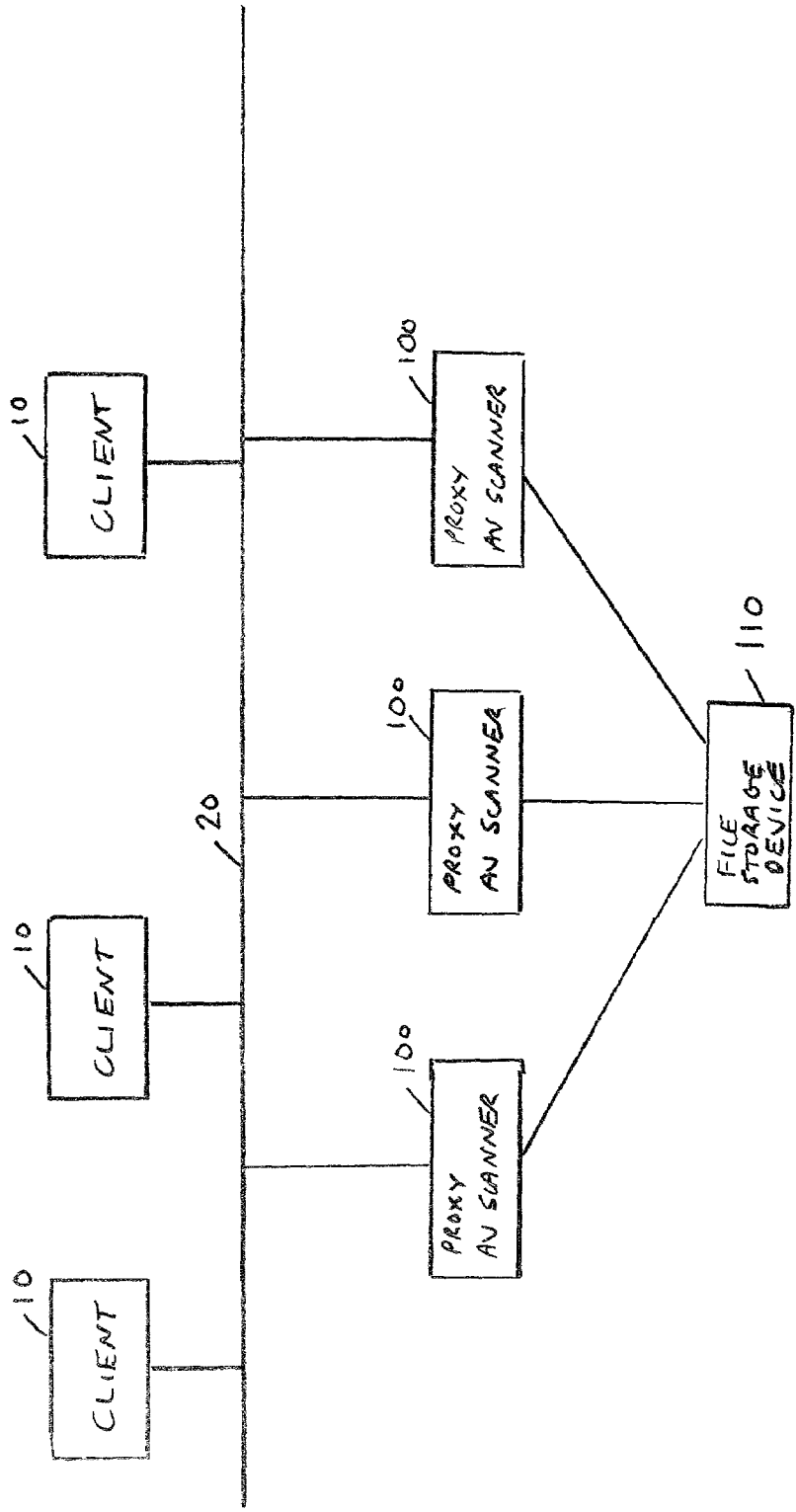
FIG. 9 is a block diagram of a computer network using multiple proxy AV scanners in accordance with an alternative embodiment.

FIG. 9 illustrates an alternative embodiment to that illustrated in FIG. 8, where instead of the active load balancing process performed by the file access request redirector 300, a passive load balancing approach is employed which obviates the need for a file access request redirector 300. In the embodiment illustrated in FIG. 9, there are again multiple proxy AV scanners 100 arranged to service access requests directed to the file storage device 110, so as to reduce the likelihood of a bottleneck occurring. However, rather than performing any active load balancing, each individual client device (or alternatively each individual user) is configured to always direct its file access requests to a particular one of the proxy AV scanners. Hence, if there were twelve client devices on the network, four of them may be arranged to always direct their file access requests to the first proxy AV scanner, another four may be arranged to direct their file access requests to a second proxy AV scanner, and the third set of four devices may be arranged to direct their file access requests to the third proxy AV scanner. Such an approach may statistically assist in removing the likelihood of a bottleneck, although bottlenecks might still occur, for example if a great deal of file accesses were being performed by a particular group of client devices all arranged to communicate through a single proxy AV scanner.

It will be appreciated that the multiple proxy AV scanners 100 illustrated in FIGS. 8 and 9 could each be provided within separate hardware units, for example on separate desktop PCs, or alternatively in a multiprocessing environment could be located within a single device. Similarly, the file access request redirector 300 of FIG. 8 may be provided within a separate device, or alternatively in a multiprocessing environment might be provided within the same device as one or more of the proxy AV scanners 100.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A load balancing device for balancing the load across a plurality of proxy devices arranged to perform malware scanning of files stored within a file storage device of a computer network, the computer network having a plurality of client devices arranged to issue access requests using a dedicated file access protocol to the file storage device in order to access files stored on the file storage device, the load balancing device being arranged so as to intercept access requests issued to the file storage device, and comprising:

a client interface for receiving an access request issued to the file storage device using the dedicated file access protocol;

load balancing logic for applying a predetermined load balancing routine to determine to which proxy device to direct that access request; and a proxy device interface for sending the access request to the proxy device determined by the load balancing logic, each proxy device being coupled to the file storage device;

wherein said proxy devices are arranged to perform said malware scanning of files stored within the file storage device, and the load balancing device determines to which of said plurality of proxy devices to direct any particular access request;

wherein each proxy device comprises;

(a) a first interface for receiving from the load balancing device an access request issued by one of said client devices to said file storage device using the dedicated file access protocol;

(b) a second interface for communicating with the file storage device to cause the file storage device to process the access request;

(c) processing logic for causing selected malware scanning algorithms to be executed to determine whether one of the files identified by the access request is to be considered as malware;

wherein, upon receipt of an access request, the processing logic is arranged to determine from the access request predetermined attributes, and to send those predetermined attributes to the file storage device to enable the file storage device to perform a validation check, the processing logic only allowing the access request to proceed if the file storage device confirms that the client device is allowed to access the file identified by the access request;

wherein the proxy device comprises a user cache utilized for storing the predetermined attributes;

wherein a file cache is arranged only to store files which have been determined not to be considered as malware.

2. A load balancing device as claimed in claim 1, wherein the dedicated file access protocol is the Server Message Block (SMB) protocol, and the access requests are SMB calls issued to the file storage device.

3. A load balancing device as claimed in claim 1, wherein the dedicated file access protocol is the Network File System (NFS) protocol, and the access requests are NFS calls issued to the file storage device.

4. A load balancing device as claimed in claim 1, wherein said load balancing routine is arranged, upon receipt of an access request, to poll each of the plurality of proxy devices, and to cause the access request to be sent to the first proxy device in said plurality that replies with an indication that it is available to handle the access request.

5. A load balancing device as claimed in claim 1, wherein said load balancing routine is arranged to apply a "round robin" system of allocation of access requests to proxy devices in said plurality so as to evenly distribute the access requests amongst the plurality of proxy devices.

6. A load balancing device as claimed in claim 1, wherein the proxy device interface is arranged to receive a ready signal from each proxy device in said plurality indicating whether that proxy device is ready to receive an access request, the load balancing routine being arranged to refer to said ready signals when determining to which proxy device to direct a particular access request.

7. A load balancing device as claimed in claim 1, wherein each device in the computer network is assigned an identifier, and the load balancing device is assigned the same identifier as is assigned to the file storage device, the client interface being connectable to a communication infrastructure of the computer network to enable communication between the load balancing device and said client devices, whilst the plurality of proxy devices are connectable to the proxy device interface and the file storage device is connectable to each proxy device, such that the file storage device is only accessible by said client devices via said load balancing device and one of said proxy devices.

8. A load balancing device as claimed in claim 7, wherein a plurality of file storage devices may be connected to each of said proxy devices, each file storage device having a different identifier, and the load balancing device being assigned multiple identifiers corresponding to the identifiers of the file storage devices connected to the plurality of proxy devices, the client interface being configured to receive any access requests issued to one of said file storage devices connected to the plurality of proxy devices.

9. A load balancing device as claimed in claim 1, wherein each device in the computer network is assigned an identifier, the load balancing device being assigned a unique identifier different to the identifier of the file storage device, the client devices, the load balancing device and the file storage device being connectable to a communication infrastructure of the computer network, the client devices being configured such that access requests issued by the client devices are routed to the load balancing device, and the file storage device being configured to return each processed access request to the proxy device from which that access request was received.

10. A balanced proxy system as claimed in claim 1, wherein the processing logic is responsive to configuration data to determine which malware scanning algorithms should be selected for a particular file, each proxy device further comprising a scanning engine to execute the malware scanning algorithms selected by the processing logic.

11. A balanced proxy system as claimed in claim 1, wherein each proxy device further comprises the file cache for storing files previously accessed by the client devices, upon receipt of an access request identifying a file to be read from the file storage device, the processing logic being arranged to determine whether the file identified by the access request is stored in the file cache and if so to return the file to the client device via the load balancing device without communicating with the file storage device via the second interface.

12. A load balancing device as claimed in claim 1, wherein the access requests are buffered when the proxy device is busy and unable to process the access requests utilizing the load balancing device.

13. A load balancing device as claimed in claim 1, wherein the load balancing device maintains an additional cache including details about the access requests utilizing the proxy devices.

14. A load balancing device as claimed in claim 13, wherein the additional cache is utilized to allocate subsequent access requests for a particular file to one of the proxy devices that handled a previous access request for the particular file.

15. A load balancing device as claimed in claim 1, wherein the predetermined attributes in the user cache are re-used by the proxy device during the processing of the access request.

16. A method of operating a load balancing device to balance the load across a plurality of proxy devices arranged to perform malware scanning of files stored within a file storage device of a computer network, the computer network having a plurality of client devices arranged to issue access requests using a dedicated file access protocol to the file storage device in order to access files stored on the file storage device, the load balancing device being arranged so as to intercept access requests issued to the file storage device, and the method comprising the steps of:
  (a) receiving an access request issued to the file storage device using the dedicated file access protocol;
  (b) applying a predetermined load balancing routine to determine to which proxy device to direct that access request; and
  (c) sending the access request to the proxy device determined at said step (b), each proxy device being coupled to the file storage device;
  wherein said proxy devices are arranged to perform said malware scanning of files stored within the file storage device, and the load balancing device determines to which of said plurality of proxy devices to direct any particular access request;
  wherein each proxy device comprises:
    (a) a first interface for receiving from the load balancing device an access request issued by one of said client devices to said file storage device using the dedicated file access protocol;
    (b) a second interface for communicating with the file storage device to cause the file storage device to process the access request;
    (c) processing logic for causing selected malware scanning algorithms to be executed to determine whether one of the files identified by the access request is to be considered as malware;
  wherein, upon receipt of an access request, the processing logic is arranged to determine from the access request predetermined attributes, and to send those predetermined attributes to the file storage device to enable the file storage device to perform a validation check, the processing logic only allowing the access request to proceed if the file storage device confirms that the client device is allowed to access the file identified by the access request;
  wherein the proxy device comprises a user cache utilized for storing the predetermined attributes;
  wherein a file cache is arranged only to store files which have been determined not to be considered as malware.

17. A method as claimed in claim 16, wherein the dedicated file access protocol is the Server Message Block (SMB) protocol, and the access requests are SMB calls issued to the file storage device.

18. A method as claimed in claim 16, wherein the dedicated file access protocol is the Network File System (NFS) protocol, and the access requests are NFS calls issued to the file storage device.

19. A method as claimed in claim 16, wherein said load balancing routine is arranged, upon receipt of an access request, to poll each of the plurality of proxy devices, and to cause the access request to be sent to the first proxy device in said plurality that replies with an indication that it is available to handle the access request.

20. A method as claimed in claim 16, wherein said load balancing routine is arranged to apply a "round robin" system of allocation of access requests to proxy devices in said plurality so as to evenly distribute the access requests amongst the plurality of proxy devices.

21. A method as claimed in claim 16, wherein the load balancing device is arranged to receive a ready signal from each proxy device in said plurality indicating whether that proxy device is ready to receive an access request, the load balancing routine being arranged to refer to said ready signals when determining to which proxy device to direct a particular access request.

22. A method as claimed in claim 16, wherein each device in the computer network is assigned an identifier, and the load balancing device is assigned the same identifier as is assigned to the file storage device, the method comprising the steps of:
  connecting a client interface of the load balancing device to a communication infrastructure of the computer network to enable communication between the load balancing device and said client devices;
  connecting the plurality of proxy devices to a proxy device interface of the load balancing device; and
  connecting the file storage device to each proxy device, such that the file storage device is only accessible by said client devices via said load balancing device and one of said proxy devices.

23. A method as claimed in claim 22, wherein a plurality of file storage devices may be connected to each of said proxy devices, each file storage device having a different identifier, and the load balancing device being assigned multiple identifiers corresponding to the identifiers of the file storage devices connected to the plurality of proxy devices, the client interface being configured to receive any access requests issued to one of said file storage devices connected to the plurality of proxy devices.

24. A method as claimed in claim 16, wherein each device in the computer network is assigned an identifier, the load balancing device being assigned a unique identifier different to the identifier of the file storage device, the method comprising the steps of:
  connecting the client devices, the load balancing device and the file storage device to a communication infrastructure of the computer network;
  configuring the client devices such that access requests issued by the client devices are routed to the load balancing device; and
  configuring the file storage device to return each processed access request to the proxy device from which that access request was received.

25. A method as claimed in claim 16, wherein said step (iii) comprises the steps of:
  responsive to configuration data, determining which malware scanning algorithms should be selected for a particular file; and
  employing a scanning engine to execute the malware scanning algorithms selected by said determining step.

26. A method as claimed in claim 16, wherein each proxy device is arranged to perform the further steps of:
  storing within the file cache files previously accessed by the client devices;
  upon receipt of an access request identifying a file to be read from the file storage device, determining whether the file identified by the access request is stored in the file cache and if so to return the file to the client device via the load balancing device without communicating with the file storage device.

27. A computer program embodied in a computer-readable medium for configuring a load balancing device to perform a method of balancing the load across a plurality of proxy devices arranged to perform malware scanning of files stored within a file storage device of a computer network, the computer network having a plurality of client devices arranged to issue access requests using a dedicated file access protocol to the file storage device in order to access files stored on the file storage device, the load balancing device being arranged so as to intercept access requests issued to the file storage device, and the computer program embodied in a computer-readable medium comprising:
  (a) client interface code operable to receive an access request issued to the file storage device using the dedicated file access protocol;
  (b) load balancing code operable to apply a predetermined load balancing routine to determine to which proxy device to direct that access request; and
  (c) proxy device interface code operable to send the access request to the proxy device determined by the load balancing logic, each proxy device being coupled to the file storage device;
  wherein said proxy devices are arranged to perform said malware scanning of files stored within the file storage device, and the load balancing device determines to which of said plurality of proxy devices to direct any particular access request;
  wherein each proxy device comprises:
    (a) a first interface for receiving from the load balancing device an access request issued by one of said client devices to said file storage device using the dedicated file access protocol;
    (b) a second interface for communicating with the file storage device to cause the file storage device to process the access request;
    (c) processing logic for causing selected malware scanning algorithms to be executed to determine whether one of the files identified by the access request is to be considered as malware;
  wherein, upon receipt of an access request, the processing logic is arranged to determine from the access request predetermined attributes, and to send those predetermined attributes to the file storage device to enable the file storage device to perform a validation check, the processing logic only allowing the access request to proceed if the file storage device confirms that the client device is allowed to access the file identified by the access request;
  wherein the proxy device comprises a user cache utilized for storing the predetermined attributes;
  wherein a file cache is arranged only to store files which have been determined not to be considered as malware.

28. A computer program embodied in a computer-readable medium as claimed in claim 27, wherein the dedicated file access protocol is the Server Message Block (SMB) protocol, and the access requests are SMB calls issued to the file storage device.

29. A computer program embodied in a computer-readable medium as claimed in claim 27, wherein the dedicated file access protocol is the Network File System (NFS) protocol, and the access requests are NFS calls issued to the file storage device.

30. A computer program embodied in a computer-readable medium as claimed in claim 27, wherein said load balancing routine is arranged, upon receipt of an access request, to poll each of the plurality of proxy devices, and to cause the access request to be sent to the first proxy device in said plurality that replies with an indication that it is available to handle the access request.

31. A computer program embodied in a computer-readable medium as claimed in claim 27, wherein said load balancing routine is arranged to apply a "round robin" system of allocation of access requests to proxy devices in said plurality so as to evenly distribute the access requests amongst the plurality of proxy devices.

32. A computer program embodied in a computer-readable medium as claimed in claim 27, wherein the load balancing device is arranged to receive a ready signal from each proxy device in said plurality indicating whether that proxy device is ready to receive an access request the load balancing routine being arranged to refer to said ready signals when determining to which proxy device to direct a particular access request.

33. A computer program embodied in a computer-readable medium as claimed in claim 27, wherein each device in the computer network is assigned an identifier, and the load balancing device is assigned the same identifier as is assigned to the file storage device, a client interface of the load balancing device being connectable to a communication infrastructure of the computer network to enable communication between the load balancing device and said client devices, whilst the plurality of proxy devices are connectable to a proxy device interface of the load balancing device and the file storage device is connectable to each proxy device, such that the file storage device is only accessible by said client devices via said load balancing device and one of said proxy devices.

34. A computer program embodied in a computer readable medium as claimed in claim 33, wherein a plurality of file storage devices may be connected to each of said proxy devices, each file storage device having a different identifier, and the load balancing device being assigned multiple identifiers corresponding to the identifiers of the file storage devices connected to the plurality of proxy devices, the client interface code being operable to receive any access requests issued to one of said file storage devices connected to the plurality of proxy devices.

35. A computer program embodied in a computer-readable medium as claimed in claim 27, wherein each device in the computer network is assigned an identifier, the load balancing device being assigned a unique identifier different to the identifier of the file storage device, the client devices, the load balancing device and the file storage device being connectable to a communication infrastructure of the computer network, the client devices being configured such tat access requests issued by the client devices are routed to the load balancing device, and the file storage device being configured to return each processed access request to the proxy device from which that access request was received.

36. A computer program embodied in a computer-readable medium as claimed in claim 27, wherein said algorithm invoking code is operable to determine, responsive to configuration data, which malware scanning algorithms should be selected for a particular file, and the second computer program product further comprises scanning engine code responsive to said algorithm invoking code and operable to execute the malware scanning algorithms selected by said algorithm invoking code.

37. A computer program embodied in a computer-readable medium as claimed in claim 27, wherein said second computer program embodied in a computer-readable medium further comprises:
  caching code operable to store within the file cache files previously accessed by the client devices;
  the reception code being operable, upon receipt of an access request identifying a file to be read from the file storage device, to determine whether the file identified by the access request is stored in the file cache and if so to return the file to the client device via the load balancing device without communicating with the file storage device.

* * * * *

UNITED STATES PATENT AND TRADEMARK OFFICE
CERTIFICATE OF CORRECTION

| | | |
|---|---|---|
| PATENT NO. | : 7,093,002 B2 | Page 1 of 1 |
| APPLICATION NO. | : 10/004120 | |
| DATED | : August 15, 2006 | |
| INVENTOR(S) | : Wolff et al. | |

It is certified that error appears in the above-identified patent and that said Letters Patent is hereby corrected as shown below:

On the Title Page, item (74), replace "Christopher J. Pramaty" with --Christopher J. Hamaty--.

Col. 2, line 30, replace "farther" with --further--.

In the claims:
Col. 20, line 3, replace "request" with --request,--;
Col. 20, line 38, replace "tat" with --that--.

Signed and Sealed this

Second Day of November, 2010

David J. Kappos
*Director of the United States Patent and Trademark Office*